(12) United States Patent
Murasumi et al.

(10) Patent No.: US 11,636,630 B2
(45) Date of Patent: Apr. 25, 2023

(54) VEHICLE DISPLAY CONTROL DEVICE AND VEHICLE DISPLAY CONTROL METHOD FOR DISPLAYING PREDICTED WHEEL LOCUS

(71) Applicants: DENSO CORPORATION, Kariya (JP); TOYOTA JIDOSHA KABUSHIKI KAISHA, Toyota (JP)

(72) Inventors: Miki Murasumi, Kariya (JP); Shogo Kida, Kariya (JP); Tomoki Miyata, Toyota (JP); Jun Kamishima, Toyota (JP); Yamato Yorifuji, Togo-cho (JP); Kohei Maejima, Nagakute (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/643,578

(22) Filed: Dec. 9, 2021

(65) Prior Publication Data

US 2022/0189077 A1     Jun. 16, 2022

(30) Foreign Application Priority Data

Dec. 14, 2020  (JP) .............................. JP2020-206851

(51) Int. Cl.
*G06T 11/00* (2006.01)
*B60R 1/27* (2022.01)
*G06F 3/03* (2006.01)

(52) U.S. Cl.
CPC ............... *G06T 11/00* (2013.01); *B60R 1/27* (2022.01); *G06F 3/03* (2013.01); *G06T 2210/62* (2013.01)

(58) Field of Classification Search
CPC ....... G06T 11/00; G06T 2210/62; B60R 1/27; G06F 3/03
See application file for complete search history.

(56) References Cited

U.S. PATENT DOCUMENTS

| | | | |
|---|---|---|---|
| 2010/0253543 A1* | 10/2010 | Szczerba | B60Q 9/005 340/932.2 |
| 2014/0055487 A1 | 2/2014 | Kiyo et al. | |
| 2015/0081174 A1* | 3/2015 | Marczok | B60Q 9/006 701/41 |
| 2016/0152264 A1 | 6/2016 | Watanabe et al. | |
| 2016/0350894 A1 | 12/2016 | Kosaki | |

(Continued)

FOREIGN PATENT DOCUMENTS

| | | | | |
|---|---|---|---|---|
| JP | 2011-116149 A | | 6/2011 | |
| JP | 2011116149 A | * | 6/2011 | ......... B62D 15/0295 |
| JP | 2013-74350 A | | 4/2013 | |

*Primary Examiner* — Terrell M Robinson
(74) *Attorney, Agent, or Firm* — Maschoff Brennan

(57) ABSTRACT

A vehicle display control device includes: a locus determination unit determining a predicted locus of a wheel of a subject vehicle according to a steering angle of the subject vehicle; and a display processing unit displaying an image of a field view of the subject vehicle including a vehicle body of the subject vehicle on a display device, and the display processing unit superimposes the guide line indicating the predicted locus determined by the locus determination unit on the image of the field view regardless of the steering angle of the subject vehicle, while semi-transparently displaying a portion of the guide line which overlaps with the vehicle body, thereby allowing visibility of the vehicle body.

18 Claims, 6 Drawing Sheets

(56) References Cited

U.S. PATENT DOCUMENTS

2017/0305345 A1\* 10/2017 Hashimoto ...... H04N 5/232945
2020/0031283 A1\* 1/2020 Nakasho ................ B60R 1/002
2020/0218910 A1\* 7/2020 Herman ................ G06V 20/20

\* cited by examiner

US 11,636,630 B2

VEHICLE DISPLAY CONTROL DEVICE AND VEHICLE DISPLAY CONTROL METHOD FOR DISPLAYING PREDICTED WHEEL LOCUS

CROSS REFERENCE TO RELATED APPLICATION

The present application is based on and claims the benefit of priority of Japanese Patent Application No. 2020-206851, filed on Dec. 14, 2020, the disclosure of which is incorporated herein by reference.

TECHNICAL FIELD

The present disclosure generally relates to a vehicle display control device and a vehicle display control method.

BACKGROUND INFORMATION

There is known a technique for displaying a predicted locus of a wheel/tire according to a steering angle of a subject vehicle together with an image of the surroundings of the subject vehicle. A comparative reference discloses a technique for superimposing and displaying a rear wheel width locus on side captured image data of a vehicle (i.e., on a side view image of a vehicle) when the steering angle of a vehicle is a predetermined value or more.

SUMMARY

It is an object of the present disclosure to provide a vehicle display control device and a vehicle display control method that enable a locus of a vehicle wheel to be displayed in an easy-to-understand manner while suppressing annoyance to the user.

BRIEF DESCRIPTION OF DRAWINGS

Objects, features, and advantages of the present disclosure will become more apparent from the following detailed description made with reference to the accompanying drawings, in which.

DETAILED DESCRIPTION

Figure 1:
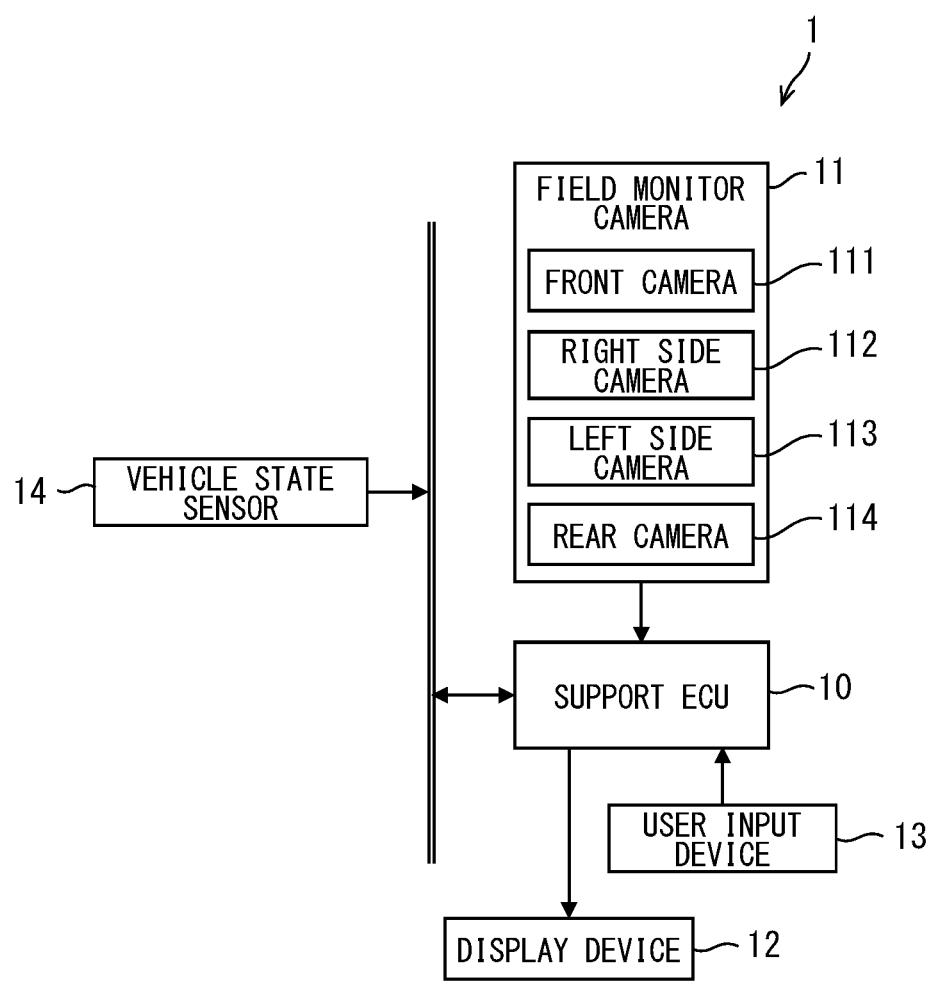
FIG. 1 is a diagram showing a schematic configuration of a vehicle system 1.

Several embodiments for the present disclosure are described with reference to the drawings. For convenience of description, parts having the same functions as the parts shown in the drawings used in the description so far, up to that point, in multiple embodiments may be designated by the same reference numerals and the description thereof may be omitted. The descriptions of other embodiments may be referred to with respect to these portions given the same reference signs.

First Embodiment

<Schematic Configuration of Vehicle System 1>

The following describes the first embodiment of the present disclosure with reference to the accompanying drawings. A vehicle system 1 shown in FIG. 1 can be used in a vehicle, and includes a support ECU 10, a field monitor camera 11, a display device 12, a user input device 13, and a vehicle state sensor 14. For example, the support ECU 10 and the vehicle state sensor 14 may be connected to an in-vehicle LAN. Hereinafter, a vehicle using the vehicle system 1 is referred to as a subject vehicle.

Figure 2:
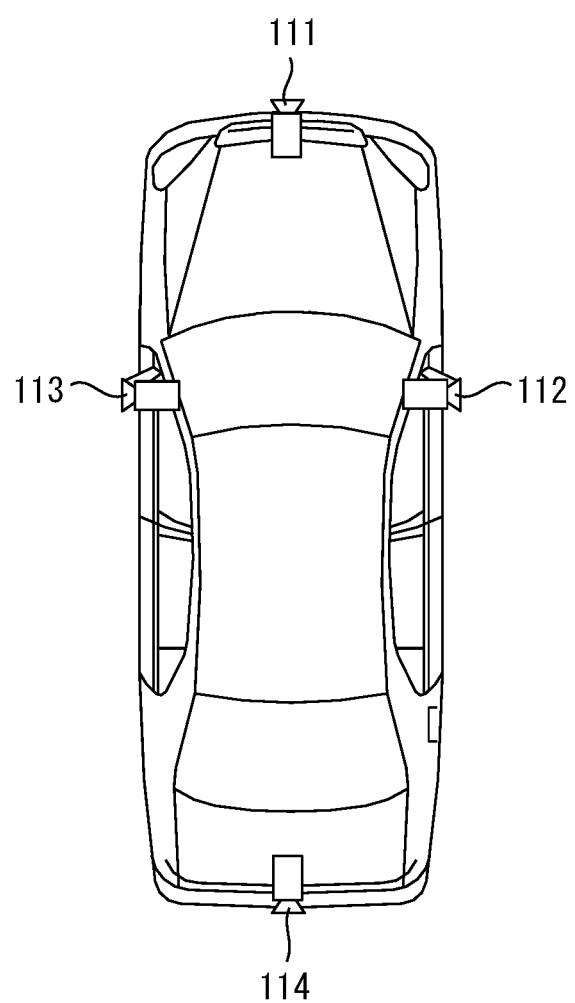
FIG. 2 is a diagram showing arrangement of a front camera, a right side camera, a left side camera, and a rear camera.

The field monitor camera 11 is a camera used for field monitoring of the subject vehicle, monitoring surrounding/field around the subject vehicle. The field monitor camera 11 is an imaging device that images the surroundings of the subject vehicle. The field monitor camera 11 includes a front camera 111, a right side camera 112, a left side camera 113, and a rear camera 114. Here, an example of the arrangement of the front camera 111, the right side camera 112, the left side camera 113, and the rear camera 114 in the present embodiment is shown in FIG. 2.

The front camera 111 is provided at a front part of the subject vehicle. The front camera 111 sets a predetermined range in front of the subject vehicle as an imaging range. The right side camera 112 is provided on a right side of the subject vehicle. The right side camera 112 sets a predetermined range on the right side of the subject vehicle as an imaging range. The left side camera 113 is provided on a left side of the subject vehicle. The left side camera 113 sets a predetermined range on the left side of the subject vehicle as an imaging range. The rear camera 114 is provided at a rear part of the subject vehicle. The rear camera 114 sets a predetermined range behind the subject vehicle as an imaging range. At least one of the front camera 111, the right side camera 112, the left side camera 113, and the rear camera 114 includes a vehicle body of the subject vehicle in the imaging range. In an example of the present embodiment, the following description is made assuming that the right side camera 112 and the left side camera 113 include the vehicle body of the subject vehicle in the imaging range.

The display device 12 is provided in a vehicle interior of the subject vehicle. Examples of the display device 12 include a center information display (hereinafter, CID), a meter multi-information display (hereinafter, meter MID), a display of a navigation device, and the like. As an example, the display device 12 may be a CID. The CID is a display device in which a display area is arranged in a center cluster or center console.

The user input device 13 receives input from the user. The user input device 13 may be an operation device that receives an operation input from the user. The user input device 13 is not limited to an operation device that accepts operation input as long as it is a device that accepts input from the user. For example, the user input device 13 may be a voice input device that accepts a voice command input from the user. For example, the user input device 13 may be a steering switch provided on a spoke portion of a steering wheel. The user input device 13 may also be a touch switch integrated with the display device 12.

The vehicle state sensor 14 is a group of sensors for detecting a travel state of the subject vehicle. The vehicle state sensor 14 includes a vehicle speed sensor, a steering angle sensor, a shift position sensor, and the like. The vehicle speed sensor detects a vehicle speed of the subject vehicle. The steering angle sensor detects a steering angle of the subject vehicle. The shift position sensor detects a shift position of the subject vehicle. The vehicle state sensor 14 outputs a detection result to the in-vehicle LAN. The detection result of the vehicle state sensor 14 may be output to the in-vehicle LAN via an ECU other than the support ECU 10 mounted on the subject vehicle.

The support ECU 10 is connected to the field monitor camera 11, the display device 12, and the user input device 13. The support ECU 10 includes, for example, a processor, a memory, an I/O, and a bus connecting these. The support ECU 10 executes a process related to support for travel of the subject vehicle by executing a control program stored in the memory. The memory mentioned here is a non-transitory, tangible storage medium for non-transitorily storing programs and data that can be read by a computer. The non-transitory, tangible storage medium is realized by a semiconductor memory, a magnetic disk, or the like. The support ECU 10 performs a process for displaying an image of the surrounding field of the subject vehicle or field view from the subject vehicle (hereinafter, field image) on the display device 12 in order to support the travel of the subject vehicle. The support ECU 10 corresponds to a vehicle display control device. The details of the support ECU 10 are described below.

<Configuration of Support ECU 10>

Figure 3:
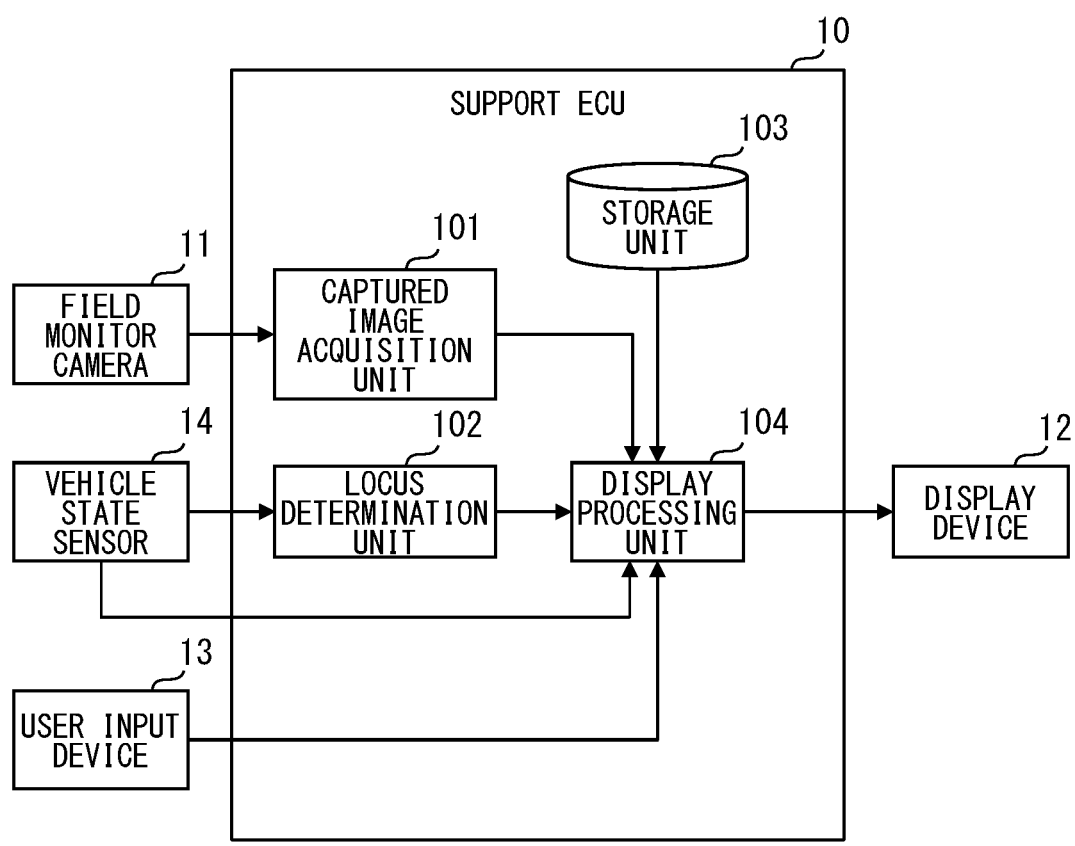
FIG. 3 is a diagram showing a schematic configuration of a support ECU.

Here, a schematic configuration of the support ECU 10 is with reference to FIG. 3. As shown in FIG. 3, the support ECU 10 includes a captured image acquisition unit 101, a locus determination unit 102, a storage unit 103, and a display processing unit 104 as functional blocks. A part or all of the functions performed by the support ECU 10 may be configured as hardware by one or a plurality of ICs or the like. Further, a part or all of the functional blocks included in the support ECU 10 may be realized by executing software by a processor and a combination of hardware members. Performing the processing of each of the functional blocks of the support ECU 10 by the computer corresponds to performing the vehicle display control method.

The captured image acquisition unit 101 acquires captured images sequentially captured by the field monitor camera 11. The captured image acquisition unit 101 acquires captured images sequentially captured by the front camera 111, the right side camera 112, the left side camera 113, and the rear camera 114. The image of a field view in front of the subject vehicle captured by the front camera 111 is hereinafter referred to as a front image. The captured image on the right side of the subject vehicle captured by the right side camera 112 is hereinafter referred to as a right side image. The captured image on the left side of the subject vehicle captured by the left side camera 113 is hereinafter referred to as a left side image. The captured image of a rear view of the subject vehicle captured by the rear camera 114 is hereinafter referred to as a rear image. As described above, in the example of the present embodiment, the right side image and the left side image include a captured image of the vehicle body of the subject vehicle. The right/left side may include a front right/left side of the subject vehicle or a rear right/left side of the subject vehicle.

The locus determination unit 102 determines the predicted locus of the wheels of the subject vehicle according to the steering angle of the subject vehicle. The process in the locus determination unit 102 corresponds to a locus determination step. The locus determination unit 102 may use the detection result of the steering angle sensor of the vehicle state sensors 14 as a steering angle of the subject vehicle. The locus determination unit 102 may determine at least one of the front wheels locus and the rear wheels locus as the predicted locus of the wheels of the subject vehicle. In the following, a case where the locus determination unit 102 determines the predicted locus of the rear wheels of the subject vehicle is described as an example. The locus determination unit 102 may determine the predicted locus according to a steering angle $\theta$ based on a turning radius R derived by an equation $R=L/\tan\theta$, for example. In such case, a turning center O may exist (i.e., be put) on an extension line of an axle of the subject vehicle. $\theta$ is the steering angle, and L is a wheelbase of the subject vehicle. In addition, the locus determination unit 102 may determine the predicted locus, by arranging a locus arc of an outermost circumference (e.g., a contour) of the subject vehicle calculated based on the steering angle and the vehicle speed to pass through (e.g., aligned with) each of a left rear wheel and a right rear wheel of the subject vehicle.

The storage unit 103 stores vehicle body specifications of the subject vehicle. The vehicle body specifications of the subject vehicle may be the wheelbase, wheel spacing, etc. of the subject vehicle. The locus determination unit 102 may determine the predicted locus using the wheelbase or the like stored in the storage unit 103. In addition, the storage unit 103 stores information such as icons and texts used for images to be displayed on the display device 12.

The display processing unit 104 causes the display device 12 to display a field image of the subject vehicle. The display processing unit 104 displays the captured image acquired by the captured image acquisition unit 101 as a field image of the subject vehicle. The display processing unit 104 may switch whether or not the field image is displayed on the display device 12 according to the on/off of a display function performed in response to the user's input on the user input device 13. The captured image may be slightly processed (e.g., contrast control, etc.) before being displayed, or may be used as a layer to create a layered image for display.

The display processing unit 104 may display at least a part of the captured image of the front image, the right side image, the left side image, and the rear image acquired by the captured image acquisition unit 101. The display processing unit 104 may switch and display a combination of the captured images to be displayed at the same time (i.e., may pick and choose the images) among the front image, the right side image, the left side image, and the rear image. For example, by default, the front image, the right side image, and the left side image may be displayed at the same time. Further, when the shift position sensor of the vehicle state sensor 14 detects that the shift position is a reverse position, the rear image may be displayed instead of the front image. The display processing unit 104 may be configured to switch the combination of the captured images to be displayed on the display device 12 according to the user's input on the user input device 13. Further, the display processing unit 104 may be configured to display all of the front image, the right side image, the left side image, and the rear image at the same time.

In the present embodiment, a case where the display processing unit 104 displays at least one of the right side image and the left side image is described as an example. When the display processing unit 104 displays either the right side image or the left side image, the display device 12 displays the field image of the subject vehicle including the vehicle body of the subject vehicle. In the present embodiment, a case where the display processing unit 104 simultaneously displays the front image, the right side image, and the left side image is taken as an example, and the following description describes such an example. Hereinafter, when the right side image and the left side image are not distinguished, they are referred to collectively as the side images. In the following, the side image (a left side image or a right side image) is as a field image of the subject vehicle including the vehicle body of the subject vehicle.

The display processing unit 104 superimposes (i.e., superimposingly displays) a guide line indicating the predicted locus determined by the locus determination unit 102 on the side image regardless of the steering angle of the subject vehicle, thus creating a "layered image" for display. Specifically, the display processing unit 104 displays a portion of the guide line that overlaps with the vehicle body of the subject vehicle (hereinafter, a vehicle body portion of the guide line) so that the vehicle body is displayed/seen semi-transparently through the guide line. The details of how the guide line is displayed may be as follows. The processing in the display processing unit 104 corresponds to a display processing step.

Figure 4:
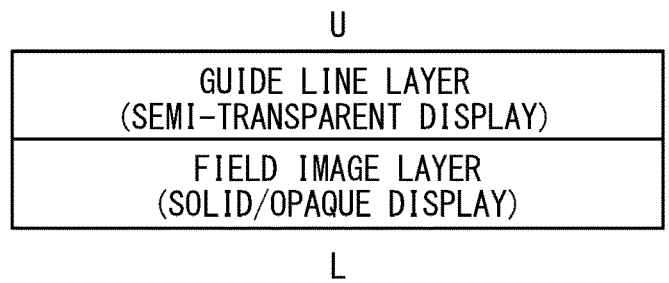
FIG. 4 is a diagram for explaining how to superimpose layers for drawing an image.

The display processing unit 104 may draw (store or define) the captured side image and the guide line on different layers. The layer on which the captured side image is drawn is called as a field image layer. The layer on which the guide line is drawn is called a guide line layer. As shown in FIG. 4, the display processing unit 104 displays a "layered image" including the guide line layer on top of (i.e., as an upper/cover layer of) the field image layer. Of course, the displayed image is two-dimensional, but image processing techniques such as "layering" with semi-transparent layer create a three-dimensional illusion or effect.

FIG. 4 is a diagram for explaining an example of how to superimpose layers for drawing an image. U in FIG. 4 indicates an upper layer side. L in FIG. 4 indicates a lower layer side. The display processing unit 104 makes the field image layer non-transparently displayed (i.e., displays the image non-transparently). Conceptually, a "layered image" is displayed such that a user appears to view the layered image from top (upper) to bottom (lower). An upper layer object may overlap a lower layer object, and may block (fully block or semi-transparently block) a user's view of the lower layer object in a displayed layered image. More specifically, the field image layer is "solid" or "opaque" (not transparent, and not semi-transparent).

For example, the display processing unit 104 makes at least a portion of the guide line layer semi-transparent. That is, the guide line is displayed as a semi-transparent object. The display processing unit 104 causes the guide line layer to be semi-transparently displayed. The transparency (or inversely, the opacity) may be adjusted by the user, and/or may be dependent upon ambient lighting, and/or may depend upon a color of the vehicle, and/or may depend upon a color of the guide line. Decreasing the transparency (equivalent to increasing the opacity) makes the guide line appear more solid.

The guide line layer is fully transparent in areas other than where the guide line is present. By the configuration described above, it is possible to display, semi-transparently, a portion of the guide line that overlaps with the vehicle body (an "overlapping portion of the guide line", or "a first part of the guideline") so that the vehicle body is displayed/seen through the guide line. A portion of the guide line that does NOT overlap the vehicle body (a "non-overlapping portion of the guide line") may be: (i) displayed such that the entire guide line has a constant semi-transparent value, (ii) displayed fully solid (0% transparency), or (iii) may be displayed with a semi-transparent value (or transparency value, or opaqueness value) that is different than that of the portion of the guide line that does overlap the vehicle body. For example, the overlapping portion of the guideline may be 40% transparent, and the non-overlapping portion of the guideline may be 60% transparent (or the reverse).

In other words, the guide line generally has an overlapping portion (first portion, or first part) that overlaps the vehicle, and a non-overlapping portion (second portion, or second part) that does not overlap the vehicle. In one embodiment, not shown, the non-overlapping portion may also be semi-transparent (see cases (i) or (iii) above), such that a cat in the non-overlapping portion is NOT solidly blocked by a guideline that overlaps the cat. This embodiment improves safety for cats and for small children.

Figure 5:
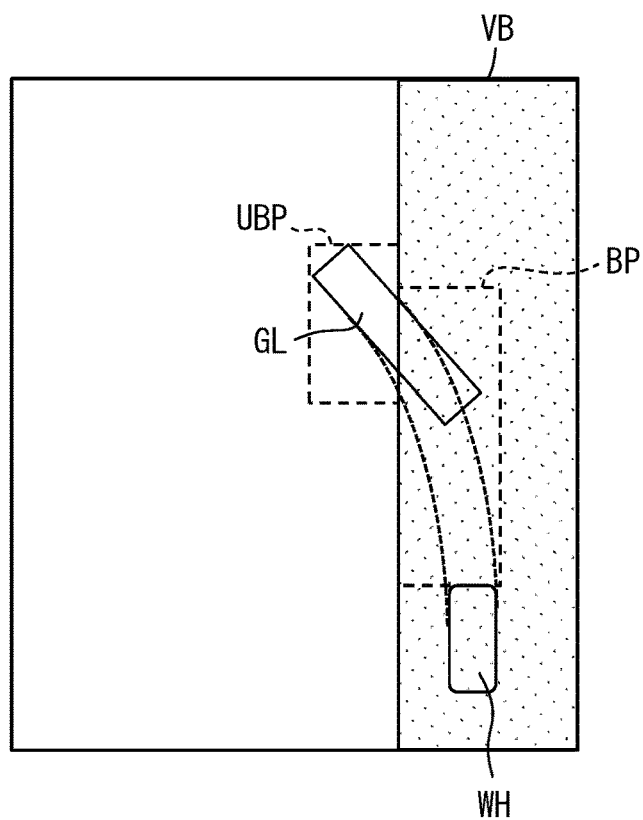
FIG. 5 is a diagram for explaining a display of a guide line.

As shown in FIG. 5, it may be preferable that the display processing unit 104 displays the non-overlapping portion of the guideline as a solid (0% transparency, which is 100% opaqueness).

FIG. 5 is a diagram for explaining a display example of the guide line. In the example of FIG. 5, the left side image is shown as an example of the side image. VB in FIG. 5 shows the vehicle body in the side image. GL in FIG. 5 indicates the guide line. WH of FIG. 5 shows an icon image (rectangle) showing a wheel position. The overlapping (first) portion of the guide line is shown by small dashed lines inside of the vehicle body portion BP, and is semi-transparent.

A broken line rectangular frame shown as UBP in FIG. 5 corresponds to the non-vehicle body portion of the field image, and includes the non-overlapping (second) portion of the guideline, and is solid (opaque). Alternatively, the second portion of the guideline may also be displayed semi-transparently. The details of how the guide line is displayed may be as follows.

Figure 6:
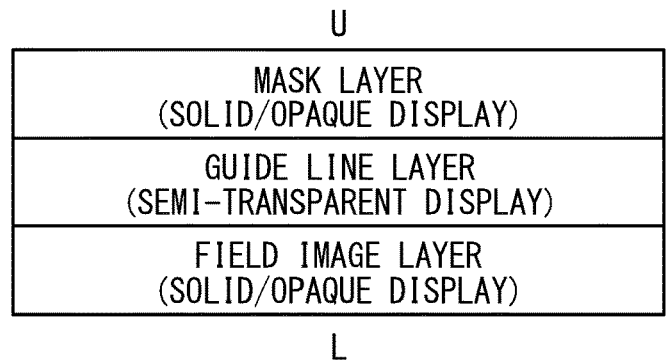
FIG. 6 is another diagram for explaining how to superimpose layers for drawing an image.

For the non-overlapping portion of the guideline, the display processing unit 104 may create a mask layer (a third layer), solidly (opaquely) drawing only the non-overlapping portion of the guide line. In FIG. 6, the display processing unit 104 solidly displays (i) the field image layer and (ii) the non-overlapping portion of the guide line in mask layer. On the other hand, the display processing unit 104 makes the overlapping guide line in the guide line layer semi-transparent. The mask layer is transparent in areas other than the non-overlapping portion of the guide line. As a result, the overlapping portion of the guide line is semi-transparently displayed, while the non-overlapping portion of the guide line is solidly displayed. The user sees the solid non-overlapping portion of the guideline as a continuous extension from the semi-transparent overlapping portion of the guideline.

The mask layer may also be configured to draw an icon image representing the wheel position. According to the above, it is possible to superimpose, on the vehicle body in the side image, the icon image showing the wheel position in a solid manner. The icon image representing the wheel position may be drawn on a layer other than the mask layer as long as it can be displayed non-transparently on the vehicle body in the side image. Further, the display processing unit 104 may be configured NOT to display the icon image showing the wheel position.

In the present embodiment, a configuration in which the mask layer is made solid is shown, but the present disclosure is not necessarily limited to such a configuration. For example, the transparency of the mask layer may be at least lower than the transparency of the guide line layer. That is, the transparency of the image of the non-vehicle body portion on the mask layer may be made lower at least than the transparency of the image of the guide line on the guide line layer for display. Even when such a configuration is adopted, it is possible to prevent the non-vehicle body portion from becoming difficult to see.

Note that the field image displayed by the display processing unit 104 may be an image obtained by performing predetermined processing on the captured image captured by the captured image acquisition unit 101. Examples of predetermined processing include image cropping, distortion correction, viewpoint conversion, and the like. Further, the display processing unit 104 may display text, an icon, or the like outside the area for displaying the field image in the display area of the display device 12. Text, icons, etc. may be displayed superimposedly in the area where the field image is displayed.

<Support Display Related Process in Support ECU 10>

Figure 7:
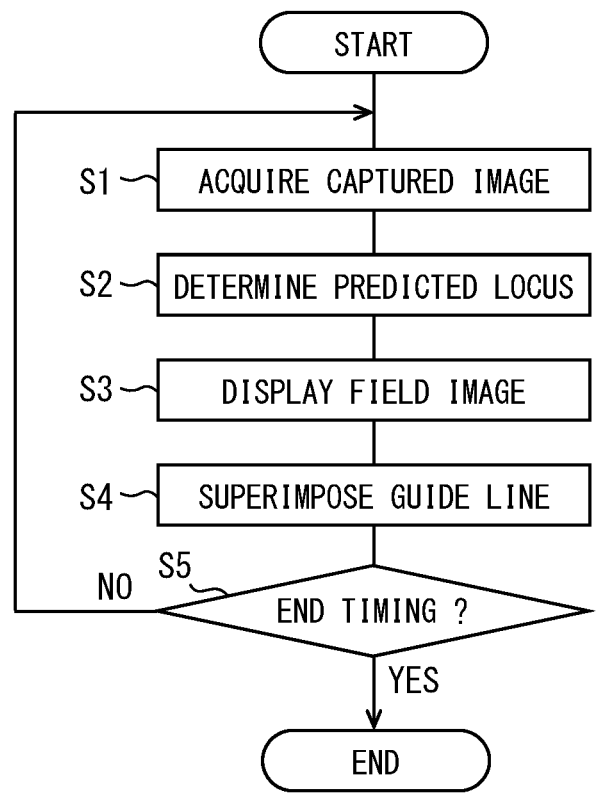
FIG. 7 is a flowchart showing a flow of a support display related process in the support ECU.

Here, an example of the flow of the process related to the display of the field image and the guide line in the support ECU 10 (hereinafter, a support display related process) is described with reference to a flowchart of FIG. 7. The flowchart of FIG. 7 may be started, for example, when (i) a switch for starting an internal-combustion engine or a motor-generator of the subject vehicle (hereinafter referred to as a power switch) is turned on and (ii) display conditions of a field image are satisfied. The display conditions include that the field image display function is turned on, the vehicle speed is equal to or less than a predetermined value, and the like. In FIG. 7, a case where the side image is always displayed when the display conditions are satisfied is described as an example.

In step S1, the captured image acquisition unit 101 acquires the captured image captured by the field monitor camera 11. In step S2, the locus determination unit 102 acquires the steering angle of the subject vehicle and determines the predicted locus of the subject vehicle (guide lne).

In step S3, the display processing unit 104 causes the display device 12 to display a field image including a side image. The combination of the captured images to be displayed may be fixed or switchable. Alternatively, the field image may be used to create a field image layer.

In step S4, the display processing unit 104 displays the semi-transparent overlapping guide line layer on top of the solid field image layer. When the mask layer is also displayed, the non-overlapping portion of the guide line may be solidly displayed on top of the guide line layer, wherein the guide line layer includes the semi-transparent overlapping portion of the guide line.

In step S5, when it is an end timing of the support display related process (YES in S5), the support display related process is ended. That is, the display of the field image and the guide line is finished. As an example of the end timing of the support display related process, a situation where the display conditions of the field image are no longer satisfied, such as when the power switch is turned off or the like. On the other hand, if it is not the end timing of the support display related process (NO in S5), the process returns to S1 and the processing is repeated.

Summary of First Embodiment

According to the configuration of the first embodiment, the guide line showing the predicted locus of the wheels of the subject vehicle is superimposed and displayed on the field image of the subject vehicle including the vehicle body regardless of the steering angle of the subject vehicle. Therefore, the presence/absence of the guide line display does not frequently switch according to the steering angle. In addition, since the vehicle body portion of the guide line that overlaps with the vehicle body is displayed so that the vehicle body is displayed (i.e., is viewable/seen) through the guide line semi-transparently, even when the steering angle is small and the vehicle body and the guide line largely overlap, the locus of the wheels of the subject vehicle becomes easy to be seen. As a result, it becomes possible to display the locus of the wheel(s) of the vehicle in an easy-to-understand manner while suppressing annoyance to the user.

Figure 8:
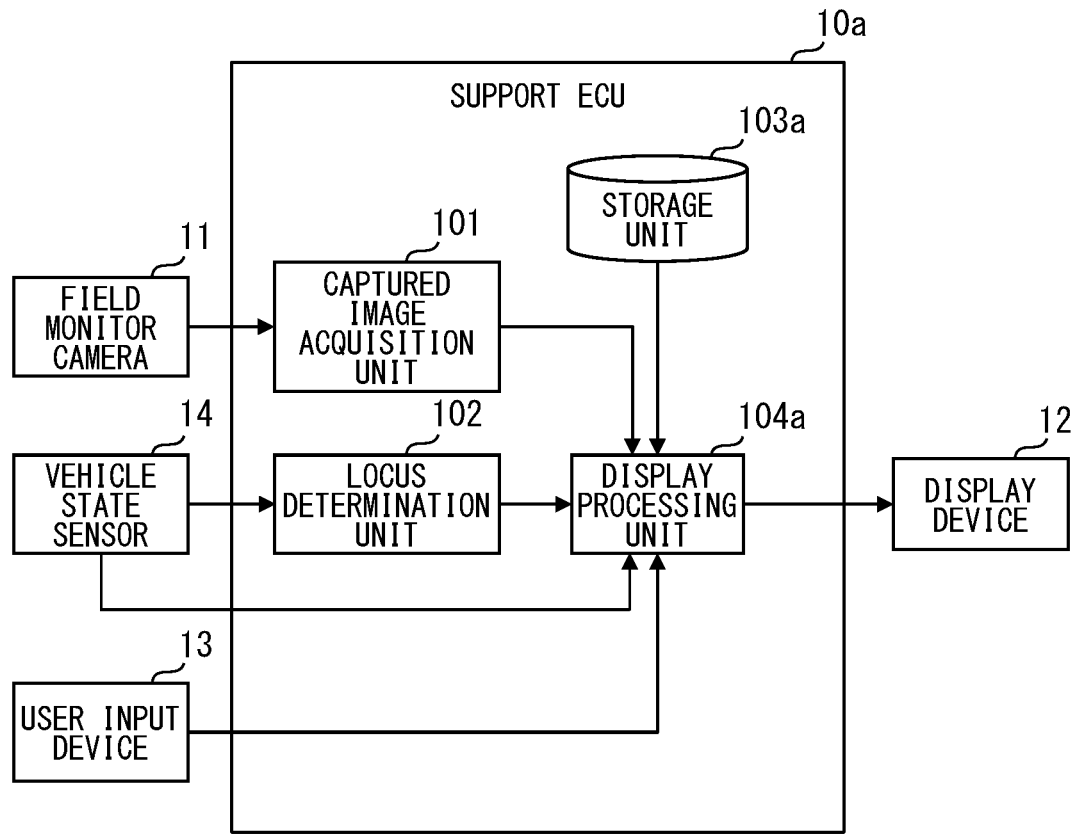
FIG. 8 is a diagram showing a schematic configuration of the support ECU.

Second Embodiment, FIG. 8

In the first embodiment, a configuration is shown in which the guide line layer to be displayed above/on top of the field image layer is transparently displayed so that the vehicle body is semi-transparently displayed through the guide line. However, the present disclosure is not necessarily limited to such a configuration. For example, the configuration of the second embodiment as follows may also be possible. The following describes a detailed example of the second embodiment with reference to the accompanying drawings.

The vehicle system 1 of the second embodiment is the same as the vehicle system 1 of the first embodiment except that a support ECU 10*a* is included instead of the support ECU 10.

<Configuration of Support ECU 10*a*>

First, a schematic configuration of the support ECU 10*a* is described with reference to FIG. 8. As shown in FIG. 8, the support ECU 10*a* includes the captured image acquisition unit 101, the locus determination unit 102, a storage unit 103*a*, and a display processing unit 104*a* as functional blocks. The support ECU 10*a* is the same as the support ECU 10 of the first embodiment except that the storage unit 103*a* and the display processing unit 104*a* are provided instead of the storage unit 103 and the display processing unit 104. Performing the processing of each of the functional blocks of the support ECU 10*a* by the computer also corresponds to performing the vehicle display control method.

The storage unit 103*a* is the same as the storage unit 103 of the first embodiment except that it stores an illustration image (hereinafter, vehicle body illustration) that imitates/represents the vehicle body of the subject vehicle. The vehicle body illustration may be a polygon image that imitates the vehicle body of the subject vehicle. As the vehicle body illustration, CG (Computer Graphics) other than the polygon image may also be used.

The display processing unit 104*a* includes a layer for drawing a vehicle body illustration (hereinafter referred to as a vehicle body illustration layer) for display on the display device 12.

Figure 9:
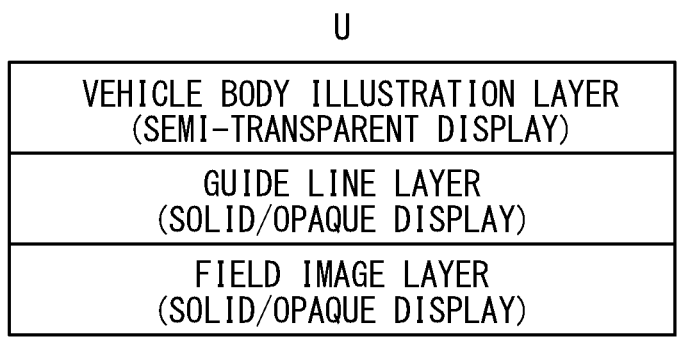
FIG. 9 is a diagram for explaining how to superimpose layers for drawing an image.

As shown in FIG. 9, the display processing unit 104*a* displays the guide line layer on top of the field image layer, and displays (semi-transparently) the vehicle body illustration layer on top of the guide line layer. The vehicle body illustration of the vehicle body illustration layer is displayed to align with and overlap with the vehicle body of the field image layer.

The field image layer and the guide line layer are the same as in the first embodiment, discussed above, and are overlapped by the vehicle body illustration layer. The vehicle body illustration in the vehicle body illustration layer is semi-transparent.

Note that, in the configuration of the second embodiment, an icon image representing the wheel position may be drawn on the guide line layer to be non-transparently displayed. According to the above, it is possible to superimpose, on the vehicle body in the side image, the icon image showing the wheel position in a non-transparent manner. The icon image representing the wheel position may be drawn on a layer other than the guide line layer as long as it can be superimposed on the vehicle body of the side image and displayed non-transparently. Further, the display processing unit 104a may be configured not to display the icon image showing the wheel position.

Even in the configuration of the second embodiment, the guide line showing the predicted locus of the wheels of the subject vehicle is superimposed and displayed on the field image of the subject vehicle including the vehicle body regardless of the steering angle of the subject vehicle.

Third Embodiment

In the above-described embodiments, a case where the guide line indicating the predicted locus of the rear wheels of the subject vehicle is superimposed on the side image and displayed has been described as an example. However, the present disclosure is not necessarily limited to such a configuration. For example, the technique may also be applied to a case where a guide line showing a predicted locus of the front wheels of the subject vehicle is superimposed on the side image and displayed. Further, it may also be applied to a case where the guide lines respectively indicating the predicted loci of the front wheels and the rear wheels of the subject vehicle are superimposed on the side image and displayed.

Fourth Embodiment

In the above-described embodiments, a case where the field image of the subject vehicle including the vehicle body of the subject vehicle is a side image has been described as an example. However, the present disclosure is not necessarily limited to such a configuration. For example, the field image of the subject vehicle including the vehicle body of the subject vehicle may be a front image or a rear image.

Fifth Embodiment

In the above-described embodiments, the vehicle system 1 has a configuration including a front camera 111, a right side camera 112, a left side camera 113, and a rear camera 114 respectively serving as the field monitor camera 11. However, the present disclosure is not necessarily limited to such a configuration. The vehicle system 1 may include only a part of the front camera 111, the right side camera 112, the left side camera 113, and the rear camera 114 as the field monitor camera 11. Further, the field image that can be displayed on the display device 12 by the display processing units 104 and 104a may be configured as only a part of the front image, the right side image, the left side image, and the rear image.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure. The control device/unit and the control method described in the present disclosure may be implemented by a special purpose computer including a processor programmed to perform one or more functions by computer programs. Alternatively, the control device/unit and the control method described in the present disclosure may be implemented by a special purpose hardware logic circuit. Alternatively, the control device/unit and the control method described in the present disclosure may be implemented by one or more special purpose computers configured as a combination of a processor executing a computer program and one or more hardware logic circuits. The computer programs may be stored, as instructions to be executed by a computer, in a tangible, non-transitory computer-readable storage medium.

What is claimed is:

1. A vehicle display control device comprising:
   a processor;
   a non-transitory computer-readable storage medium; and
   a set of computer-executable instructions stored on the non-transitory computer-readable storage medium that cause the processor to:
   determine a predicted locus of a wheel of a vehicle according to a steering angle of the vehicle;
   display a field view as an image of the vehicle including a vehicle body on a display device; and
   display a guide line indicating the predicted locus, and superimpose the guide line on the image of the field view without regard to the steering angle, wherein
   a first part of the guide line overlaps with the vehicle body, and
   the first part of the guide line is semi-transparent such that an overlapped portion of the vehicle body is semi-visible through the first part of the guide line,
   a second part of the guide line does not overlap with the vehicle body, and
   the second part of the guide line is non-transparent.

2. The vehicle display control device according to claim 1, wherein the set of computer-executable instructions further cause the processor to display a display image generated from layers, the layers including:
   a field image layer opaquely including a captured portion of the vehicle body; and
   a guide line layer semi-transparently including the first part of the guide line, wherein the guide line layer is located above the field image layer.

3. The vehicle display control device according to claim 2, wherein the layers further include:
   a mask layer including a second part of the guide line, wherein the second part of the guide line is a portion of the guide line that does NOT overlap the vehicle body.

4. The vehicle display control device of claim 3, wherein the second part of the guide line is opaque.

5. The vehicle display control device of claim 1, wherein set of computer-executable instructions further cause the processor to:
   display a guide line layer, on which the guide line is drawn;
   display a field image layer, on which the image of the field view is drawn, below the guide line layer; and
   display a vehicle body illustration layer, on which an illustration image representing the vehicle body is drawn, above the guide line layer,
   wherein a first portion of the guide line overlaps vehicle body and is opaque, and
   wherein the illustration image of the vehicle body is semi-transparent.

6. The vehicle display control device of claim 1, wherein set of computer-executable instructions further cause the processor to
when the image of the field view including a side of the vehicle is displayed on the display device, superimposingly display the guide line on the image of the field view and always display the superimposed guide line regardless of the steering angle.

7. The vehicle display control device according to claim 1, wherein
the second part is opaque.

8. The vehicle display control device according to claim 1, wherein
the predicted locus in the first part extends from a position of the wheel.

9. A vehicle display control method comprising:
determining a guide line representing a predicted locus of a wheel of a vehicle according to a steering angle of the vehicle; and
displaying an image of a field view of the vehicle including a vehicle body of vehicle on a display device, wherein
in the displaying, the guide line is superimposed on the image of the field view regardless of the steering angle,
a first part of the guide line overlaps with the vehicle body and is semi-transparently displayed, such that an overlapped portion of the vehicle body is semi-visible through the first part of the guide line, and
a second part of the guide line does not overlap with the vehicle body and is non-transparently displayed.

10. The vehicle display control method according to claim 9, wherein
the second part is opaque.

11. A vehicle display control device comprising:
a processor; and
a non-transitory computer-readable storage medium,
wherein the vehicle display control device is configured to:
acquire a captured image including a vehicle portion and a non-vehicle portion;
determine a predicted locus of a wheel for a guide line, based at least partly on a steering angle;
create a composite image for display based upon layers, wherein the layers include:
(i) a field image layer including the vehicle portion and the non-vehicle portion;
(ii) a guide line layer located above the field image layer, and including a first part of the guide line and a second part of the guide line, wherein
the first part of the guide line overlaps the vehicle portion and is semi-transparent such that an overlapped portion of the vehicle portion is semi-visible through the first part of the guide line, wherein
the second part of the guide line does not overlap the vehicle portion and is non-transparent; and
display the composite image.

12. The vehicle display control device of claim 11,
wherein the guide line layer further includes a second part of the guide line,
wherein the second part of the guide line overlaps the non-vehicle portion, and does NOT overlap the vehicle portion.

13. The vehicle display control device of claim 12,
wherein the second part of the guide line is opaque.

14. The vehicle display control device of claim 12,
wherein the second part of the guide line is semi-transparent such that a cat in the field view overlapped by the second part of the guide line is semi-visible through the second part of the guide line.

15. The vehicle display control device of claim 14, wherein a value of transparency of the first part of the guide line is NOT equal to a value of transparency of the second part of the guide line.

16. The vehicle display control device of claim 11,
wherein the composite image further includes:
(iii) a mask layer located above the guide line layer,
wherein the mask layer includes an opaque wheel icon indicating a present location of the wheel.

17. The vehicle display control device of claim 11,
wherein the composite image further includes:
(iii) a mask layer located above the guide line layer,
wherein the mask layer includes a second part of the guide line,
wherein the second part of the guide line overlaps the non-vehicle portion, and does NOT overlap the vehicle portion, and
wherein the second part of the guide line is opaque.

18. The vehicle display control device according to claim 11, wherein
the second part is opaque.

* * * * *